United States Patent
Miura et al.

(10) Patent No.: US 8,389,435 B2
(45) Date of Patent: Mar. 5, 2013

(54) METAL OXIDE CATALYST CARRIER PARTICLE AND EXHAUST GAS PURIFICATION CATALYST

(75) Inventors: Masahide Miura, Susono (JP); Nobuyuki Takagi, Susono (JP); Shinichi Matsumoto, Toyota (JP); Toshitaka Tanabe, Aichi-ken (JP); Yasutaka Nagai, Aichi-ken (JP); Kazuhiko Dohmae, Nissin (JP); Yasuo Ikeda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 839 days.

(21) Appl. No.: 12/295,454

(22) PCT Filed: Mar. 30, 2007

(86) PCT No.: PCT/IB2007/000980
§ 371 (c)(1),
(2), (4) Date: Sep. 17, 2009

(87) PCT Pub. No.: WO2007/113674
PCT Pub. Date: Oct. 11, 2007

(65) Prior Publication Data
US 2010/0004117 A1   Jan. 7, 2010

(30) Foreign Application Priority Data
Mar. 31, 2006 (JP) .................. 2006-098730

(51) Int. Cl.
*B01J 23/00* (2006.01)
*B01J 23/10* (2006.01)
*B01J 23/42* (2006.01)
*B01J 23/44* (2006.01)
*B01J 23/08* (2006.01)
*B01J 8/02* (2006.01)
*B01J 8/00* (2006.01)
*B01D 53/56* (2006.01)
*B01D 53/86* (2006.01)
*B01D 53/94* (2006.01)
*C01B 21/00* (2006.01)
*C01B 23/00* (2006.01)
*C01B 25/00* (2006.01)
*C01B 31/00* (2006.01)
*C01B 33/00* (2006.01)
*C01B 35/00* (2006.01)
*C01G 28/00* (2006.01)
*C01G 30/00* (2006.01)
*B32B 5/16* (2006.01)
*B32B 9/00* (2006.01)
*B32B 15/02* (2006.01)
*B32B 17/02* (2006.01)
*B32B 19/00* (2006.01)
*B32B 21/02* (2006.01)
*B32B 23/02* (2006.01)
*B32B 27/02* (2006.01)

(52) U.S. Cl. ........ 502/302; 502/303; 502/334; 502/339; 502/351; 502/355; 523/213.2; 523/213.5; 523/239.1; 428/403

(58) Field of Classification Search .......... 502/302, 502/303, 334, 339, 351, 355; 423/213.2, 423/213.5, 239.1; 428/403
See application file for complete search history.

(56) References Cited

U.S. PATENT DOCUMENTS

| | | | | |
|---|---|---|---|---|
| 4,868,148 | A | * | 9/1989 | Henk et al. ............. 502/303 |
| 4,921,829 | A | | 5/1990 | Ozawa et al. |
| 6,294,140 | B1 | * | 9/2001 | Mussmann et al. ..... 423/213.5 |
| 6,852,665 | B2 | * | 2/2005 | Morikawa et al. ........ 502/302 |
| 2002/0049137 | A1 | * | 4/2002 | Morikawa et al. ........ 502/351 |
| 2010/0189615 | A1 | * | 7/2010 | Gramiccioni ........... 423/213.2 |
| 2011/0152072 | A1 | * | 6/2011 | Miura .................... 502/304 |

FOREIGN PATENT DOCUMENTS

| | | |
|---|---|---|
| EP | 0 525 677 A1 | 2/1993 |
| EP | 1 457 249 A1 | 9/2004 |
| GB | 1156398 | 6/1969 |
| JP | 2000-202309 | 7/2000 |
| JP | 2003-74334 | 3/2003 |

| JP | 2004-141833 | 5/2004 |
| JP | 2005-254047 | 9/2005 |
| JP | 2005-313024 | 11/2005 |
| JP | 2005-314133 | 11/2005 |
| JP | 2005-314134 | 11/2005 |
| JP | 2006-036556 | 2/2006 |
| WO | WO 2005/102523 A1 | 11/2005 |
| WO | WO 2005/102524 A1 | 11/2005 |
| WO | WO 2005/102933 A2 | 11/2005 |
| WO | WO 2006/009327 A1 | 1/2006 |

OTHER PUBLICATIONS

"The support effect on propane combustion over platinum catalyst: control of the oxidation resistance of platinum by the acid strength of support materials," Yoshiteru Yazawa et al. Applied Catalysis A: General 233 (2002), pp. 103-112.*

"The interaction between supported Rh- and Nd2O3-enriched surface layer on ZrO2 for Rh sintering suppression," Toshitaka Tanabe et al. Catalysis Today (2011), pp. 1-8.*

"Operando X-ray absorption spectroscopy study of supported Pt catalysts during NO reduction by hydrocarbons," Toshitaka Tanabe et al. Applied Catalysis B: Environmental 105 (2011), pp. 41-49.*

"Synthesis and characterization of monodispersed SiO2/Y2O3:Eu3+ core-shell submicrospheres," Hua-Jun Feng et al. Materials Letters 60 (2006), pp. 737-740.*

Notification of Reasons(s) for Refusal for JP 2006-098730 dated Nov. 17, 2009.

Russian Office Action issued Aug. 20, 2009 for Russian Appl. No. 2008138714/04.

* cited by examiner

*Primary Examiner* — Patricia L Hailey

(74) *Attorney, Agent, or Firm* — Finnegan, Henderson, Farabow, Garrett & Dunner, LLP (57) ABSTRACT

A metal oxide catalyst carrier particle has a center portion and an outer skin portion each containing a first metal oxide and a second metal oxide. The center portion and the outer skin portion are different in composition. The mole fraction of the metal of the first metal oxide is higher in the center portion than in the outer skin portion and the mole fraction of the metal of the second metal oxide is higher in the outer skin portion than in the center portion. The second metal oxide is selected from the group consisting of rare earth oxides, except for ceria, and alkali earth metal oxides. In addition, platinum is supported on the metal oxide catalyst carrier particle, thus forming an exhaust gas purification catalyst.

15 Claims, 2 Drawing Sheets

METAL OXIDE CATALYST CARRIER PARTICLE AND EXHAUST GAS PURIFICATION CATALYST

CROSS-REFERENCE TO RELATED APPLICATIONS

This application is a national phase application of International Application No. PCT/IB2007/000980, filed Mar. 30, 2007, and claims the priority of Japanese Application No. 2006-098730, filed Mar. 31, 2006, the contents of both of which are incorporated herein by reference.

BACKGROUND OF THE INVENTION

1. Field of the Invention

The present invention relates to metal oxide catalyst carrier particles, a method for producing such particles, an exhaust gas purification catalyst made of the metal oxide catalyst carrier particles, and a method for recovering the exhaust gas purification catalyst.

2. Description of the Related Art

Exhaust gas from an internal combustion engine, such as an engine of an automobile, contains nitrogen oxide (NOx), carbon monoxide (CO), hydro carbon (HC), etc. These substances can be removed by an exhaust gas purification catalyst that is capable of oxidizing CO and HC and reducing NOx. A typical example of such an exhaust gas purification catalyst is a three-way catalyst that is made of a porous metal oxide carrier, such as γ-alumina, and precious metal, such as platinum (Pt), rhodium (Rh), and palladium (Pd), which is supported on the porous metal oxide carrier.

Usually, platinum is used as precious metal for three-way catalysts. However, when using platinum, there is a problem that, if exposed to a high-temperature exhaust gas for a prolonged period of time, platinum particles grow in size and thus the specific surface area of each platinum particle decreases accordingly, lowering the activation level of the catalyst. To counter this, various methods have been developed to suppress such growth of platinum particles.

For example, it has been discovered that, because ceria has a high affinity for precious metals exhaust gas purification, especially platinum, when ceria is used as the catalyst carrier, the growth (sintering) of precious metal particles is suppressed. In order to utilize this characteristics of ceria while compensating for disadvantages of using ceria having a relatively low heat resistance, JP-A-2005-313024, JP-A-2005-314133, JP-A-2004-141833, and JP-A-2005-254047 each describe using, as a carrier for platinum as the catalyst metal, metal oxide particles each having an outer skin portion containing much ceria and a center portion containing much alumina that is a metal oxide having a high heat resistance.

As a method for obtaining a metal oxide particle having an outer skin portion and a center portion that are different in composition, JP-A-2005-314133 describes a method in which: a sol containing colloid particles of a first metal oxide and colloid particles of a second metal oxide which have a different isoelectric point from that of the colloid particles of the first metal oxide is prepared; the pH of the sol is adjusted to be closer to the isoelectric point of the colloid particles of the first metal oxide than it is to the isoelectric point of the colloid particles of the second metal oxide so that the colloid particles of the first metal oxide are coagulated; the pH of the sol is then adjusted to be closer to the isoelectric point of the colloid particles of the second metal oxide than it is to the isoelectric point of the colloid particles of the first metal oxide so that the colloid particles of the second metal oxide are coagulated; and the coagulated product is then dried and calcined.

Meanwhile, JP-A-2000-202309 and JP-A-2003-74334 each describe a method for redispersing platinum particles, which have grown in size in use, on the carrier. The platinum redispersing method described in JP-A-2000-202309 heats exhaust gas purification catalysts, each comprised of a carrier, such as alkali earth metal oxide and rare earth oxide, and platinum supported on the carrier, at 500° C. to 1000° C. under an oxidizing atmosphere that contains oxygen atoms more than the number of moles of the supported platinum.

As the platinum is thus heated under the oxidizing atmosphere, platinum oxides appear in the surface of each platinum particle that has grown in size in use. Because platinum oxides have a high interactivity with rare earth oxides, the platinum oxides in the surface of the platinum particle move to the surface of the carrier, and thus platinum is exposed at the surface of the platinum particle. The exposed platinum is then oxidized by oxygen into platinum oxides, and these platinum oxides move to the surface of the carrier in the same manner described above. As this happens repeatedly, the platinum particles supported on rare earth oxide, or the like, are gradually dispersed in the surface of the carrier and their particle sizes decrease, thus allowing platinum oxides to be dispersedly supported on the carrier. When a catalyst in which platinum oxides are dispersedly supported on the carrier as mentioned above is placed in contact with an exhaust gas having a stoichiometric atmosphere or a reducing atmosphere, the platinum oxides are reduced into platinum, whereby the exhaust gas purification catalyst is recovered. Note that platinum oxides are easily reduced and thus their reduction reactions tend to easily occur.

SUMMARY OF THE INVENTION

The invention provides an exhaust gas purification catalyst in which platinum is redispersed appropriately, a platinum redispersion method for such an exhaust gas purification catalyst, a metal oxide catalyst carrier particle used to obtain such an exhaust gas purification catalyst, and a method for producing such a metal oxide catalyst carrier particle.

An aspect of the invention relates to a metal oxide catalyst carrier particle having a center portion and an outer skin portion, each containing a first metal oxide and a second metal oxide. The center portion and the outer skin portion are different in composition from each other. In this metal oxide catalyst carrier particle, the mole fraction of a metal of the first metal oxide is higher in the center portion than in the outer skin portion, and the mole fraction of a metal of the second metal oxide is higher in the outer skin portion than in the center portion, and the second metal oxide is selected from the group consisting of rare earth oxides, except for ceria, and alkali earth metal oxides.

According to this aspect of the invention, when a precious metal catalyst is formed by bonding platinum onto the metal oxide catalyst carrier particle, the characteristics (especially, the heat resistance) achieved by the first metal oxide in the center portion of the metal oxide catalyst carrier particle and the platinum redispersability achieved by the second metal oxide are both obtained. That is, according to the first aspect of the invention, when a precious metal carrying catalyst is made by bonding platinum onto metal oxide catalyst carrier particles according to this aspect of the invention, a large specific surface area of each metal oxide catalyst carrier particle can be maintained due to the high heat resistance of the first metal oxide and the platinum can be redispersed very effectively owing to the second metal oxide in the outer skin portion of each meal oxide catalyst carrier particle.

The metal oxide catalyst carrier particle described above may be such that the first metal oxide is selected from the group consisting of alumina, zirconia, silica, titania, and combinations among alumina, zirconia, silica, and titania. In this case, alumina is preferably used.

The metal oxide catalyst carrier particle described above may be such that the second metal oxide is selected from the group consisting of rare earth oxides except for ceria, which include neodymium oxide, praseodymium oxide, lanthanum oxide, scandium oxide, and yttrium oxide, for example. Preferably, the second metal oxide is selected from the group consisting of neodymium oxide, praseodymium oxide, and yttrium oxide.

The metal oxide catalyst carrier particle described above may be such that the specific surface area of the metal oxide catalyst carrier particle is more than 15 $m^2/g$, preferably 20 $m^2/g$, more preferably 30 $m^2/g$, still more preferably 40 $m^2/g$ after the metal oxide catalyst carrier has been alternately exposed to a rich gas (carbon monoxide (2 volume %)+nitrogen) and to a lean gas (oxygen (2 volume %)+nitrogen) at 1000° C. for 5 hours such that the gas to which the metal oxide catalyst is exposed is switched between the rich gas and the lean gas every minute.

The metal oxide catalyst carrier particle described above may be such that the first metal oxide is alumina, the second metal oxide is selected from the group consisting of neodymium oxide, praseodymium oxide, and yttrium oxide, and the specific surface area of the metal oxide catalyst carrier particle is more than 40 $m^2/g$ after the metal oxide catalyst carrier particle has been alternately exposed to a rich gas (carbon monoxide (2 volume %)+nitrogen) and to a lean gas (oxygen (2 volume %)+nitrogen) at 1000° C. for 5 hours such that the gas to which the metal oxide catalyst carrier particle is exposed is switched between the rich gas and the lean gas every minute.

Another aspect of the invention relates to an exhaust gas purification catalyst comprising a metal oxide catalyst carrier particle according to the above aspect of the invention and platinum supported on the metal oxide catalyst carrier particle.

Another aspect of the invention relates to a method for recovering an exhaust gas purification catalyst according to the invention. This method includes heating the exhaust gas purification catalyst to between 500° C. and 1000° C. under an oxidizing atmosphere that contains oxygen.

The recovery method described above may be such that a platinum reduction process is performed after the heating of the exhaust gas purification catalyst under the oxygen containing oxidizing atmosphere.

Another aspect of the invention relates to a method for producing a metal oxide catalyst carrier particle having a center portion and an outer skin portion, each containing a first metal oxide and a second metal oxide, wherein the center portion and the outer skin portion are different in composition from each other. This method includes: preparing a material solution, preferably an aqueous salt solution, which contains at least colloid particles of the first metal oxide and metal salts for the second metal oxide; coagulating the colloid particles of the first metal oxide by adjusting the pH of the material solution to a point closer to the isoelectric point of the colloid particles of the first metal oxide, preferably by adjusting the pH of the material solution to the range of ±1.0 from the isoelectric point of the colloid particles of the first metal oxide, more preferably by adjusting the pH of the material solution to the range of ±0.5 from the isoelectric point of the colloid particles of the first metal oxide, still more preferably by changing the pH of the material solution past the isoelectric point of the colloid particles of the first metal oxide, yet still more preferably by increasing the pH of the material solution past the isoelectric point of the colloid particles of the first metal oxide so as to coagulate colloid particles of the first metal oxide; increasing the pH of the material solution so as to precipitate colloid particles of the second metal oxide from the metal salts, and coagulate the colloid particles of the second metal oxide around the coagulated colloid particles of the first metal oxide, where the isoelectric point of the colloid particles of the second metal oxide is higher than the isoelectric point of the colloid particles of the first metal oxide; and drying and calcining the coagulated product.

The production method described above may be such that the first metal oxide is selected from the group consisting of alumina, zirconia, silica, titania, and combinations among alumina, zirconia, silica, and titania, and/or the second metal oxide is selected from the group consisting of rare earth oxides, except for ceria, and alkali earth metal oxides.

In this specification, "colloid particles" encompass metal oxides dispersed in a liquid dispersion medium or particles each having metal bonded to oxygen, which can be transformed into metal oxides through the removal of the dispersion medium and calcination. The dispersion medium is typically water, but it may alternatively be an organic dispersion medium, such as alcohol and acetylacetone. In general, "colloid particle" is said to have a diameter of 1 to 1000 nm, particularly 1 to 500 nm. For example, colloid particles each having a diameter less than 100 nm or 50 nm are available. Colloid particles dispersed in a liquid dispersion medium, i.e., dispersed type colloid particles, are often referred to as "sol" or "colloid solution".

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE ASPECT OF THE INVENTION

Figure 1:
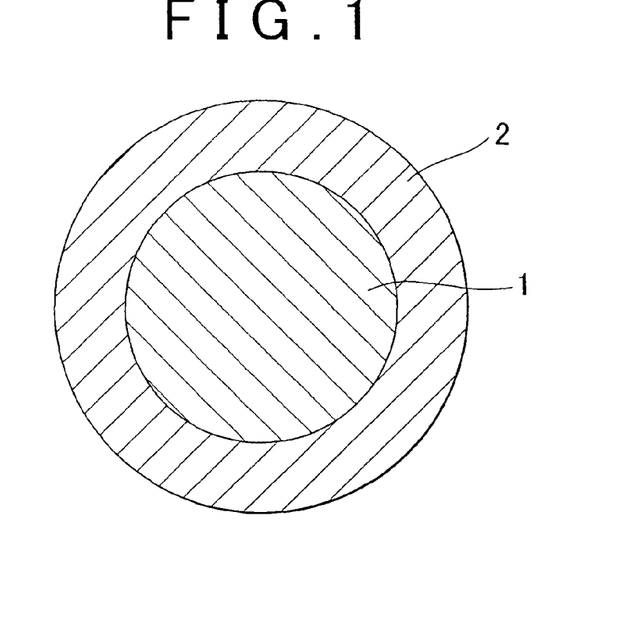
FIG. 1 is a cross-sectional view of a metal oxide catalyst carrier particle according to an aspect of the invention.

The invention will be described with reference to FIG. 1. FIG. 1 is a cross sectional view of a metal oxide catalyst carrier particle according to an aspect of the invention.

Referring to FIG. 1, the metal oxide catalyst carrier particle according to the aspect of the invention has a center portion 1 containing a relatively large amount of first metal oxides, which are for example alumina, and an outer skin portion 2 containing a relatively large amount of second metal oxides, which are for example rare earth oxides.

The boundary between the center portion 1 and the outer skin portion 2 in this metal oxide catalyst carrier particle is not necessarily clearly defined. That is, the composition at the boundary may gradually vary, which is desirable in view of the heat resistance. Also, the boundary between the center portion 1 and the outer skin portion 2 may be composed of a mixture of the first metal oxide and the second metal oxide, in particular, a solid solution of a mixture of the first metal oxide and the second metal oxide. Note that the outer skin portion 2 may be non-continuous although it appears to be continuous in FIG. 1.

Each of the center portion 1 and the outer skin portion 2 of the metal oxide catalyst carrier particle may be composed of a plurality of primary particles. In the case where metal oxide catalyst carrier particles are produced using colloid particles, the colloid particles that are used to form the center portion and the outer skin portion, respectively, correspond to the primary particles of the respective portions. However, in some cases, there is no clear boundary between the primary particles.

The metal oxide catalyst carrier particles, for example, may have an average particle diameter less than 10 μm, 5 μm, 1 μm, 500 nm, 200 nm, 100 nm, or 50 nm. For example, when the particle diameters of the colloid particles used as material are about 5 nm on the average, the average particle diameter of the metal oxide catalyst carrier particles can be made 50 nm or smaller.

Oxides of an arbitrary metal may be used as the first metal oxides for the metal oxide catalyst carrier particles. For example, metal oxides which are typically used to produce catalyst carrier particles, such as alumina, zirconia, silica, titania, or a given combination among them may be used as the first metal oxides. Especially, alumina or zirconia, more strictly speaking, alumina is preferred in view of the heat resistance and the specific surface area.

The second metal oxide for the metal oxide catalyst carrier particle is selected from the group consisting of oxides of rare earths, except for ceria, and oxides of alkali earth metals. It is preferable in view of the heat resistance that the second metal oxide be selected from oxides of rare earths, except for ceria. Oxides of these metals, as described in JP-A-2000-202309, have a relatively high affinity for platinum and platinum oxides. That is, ceria, as one of rare earth oxides, has a relatively high affinity for platinum and platinum oxides. However, using oxides of rare earths other than ceria enables platinum to be redispersed significantly effectively in each metal oxide catalyst carrier particle. This is because, for example, ceria suppresses production of platinum oxides by adsorbing oxygen using its capability of storing and releasing oxygen (Oxygen Storage Capability) under an oxidizing atmosphere, and/or because the affinity of ceria for platinum and platinum oxide is reduced by the oxygen that is stored in the surface of ceria due to its oxygen storage capability.

In addition to the first and second metal oxides, the outer skin portion and the center portion may also contain less than 50 mol % of other metal oxides, respectively. Especially, when the center portion contains zirconia or alumina, the center portion can further contain less than 1 to 50 mol % of metal, preferably 1 to 10 mol % of metal, which is selected from the group consisting of alkali earth metals and rare earth elements. Such addition of alkali earth metal oxides and rare earth element oxides, especially yttrium oxides, increases the heat resistance of zirconia or alumina contained therein, and therefore it is desirable.

An exhaust gas purification catalyst according to an aspect of the invention is obtained by bonding platinum onto a metal oxide catalyst carrier particle according to an aspect of the invention.

A known method may be used to bond platinum onto metal oxide catalyst carrier particles. For example, platinum can be bonded onto carrier particles by soaking the carrier particles in a solution containing platinum salts or platinum complex salts and then drying and calcining them. The amount of platinum to be supported on each metal oxide catalyst carrier particle is, for example, 0.01 to 5 mass %, preferably 0.1 to 2 mass %, with respect to the metal oxide catalyst carrier particle. Note that so-called NOx storing elements selected from precious metals (e.g., palladium and rhodium), base metals (e.g., copper, iron, nickel, and cobalt), alkali metals, alkali earth metals, and/or rare earth elements may also be supported on the exhaust gas purification catalyst according to this aspect of the invention.

The exhaust gas purification catalyst obtained as described above may be used by being coated onto a monolith substrate, such as a ceramic honeycomb substrate, as well as by being formed into a specific shape.

A recovery method according to another aspect of the invention is a method for recovering exhaust gas purification catalysts according to the aspect of the invention. This method includes heating the exhaust gas purification catalyst to 500° C. or higher, for example, to between 600° C. and 1000° C., preferably to between 600° C. and 800° C., under an oxidizing atmosphere containing oxygen. Specifically, this heating temperature depends on the composition of the oxidizing atmosphere-containing oxygen, the time period during which the recovery process of the exhaust gas purification catalyst is performed, and so on. If the heating temperature is too low, platinum may fail to be oxidized and redispersed sufficiently. Conversely, if the heating temperature is too high, the activation level of the catalyst may decrease due to sintering of the metal oxide catalyst carrying particles, etc.

According to the method in which platinum is redispersed under an oxidizing atmosphere, as described in JP-A-2000-202309, platinum oxides are produced at the surface of each platinum particle that has grown in size in use, and such platinum oxides then move to the surface of the carrier. As this happens repeatedly, platinum particles are dispersed in the surface of the carrier and their particle sizes decrease gradually. Thus, the platinum oxides can be dispersedly supported on the carrier.

The oxygen-containing oxidizing atmosphere used in the above recovery method is an oxidizing atmosphere having an oxidizing ability that is strong enough to obtain platinum oxides by oxidizing the platinum supported on the metal oxide catalyst carrier particles. For example, a nitrogen atmosphere containing 10 vol % or more of oxygen, preferably air, is used as the oxygen-containing oxidizing atmosphere. The calcination under this atmosphere is performed for, for example, 1 to 5 hours, preferably 2 to 4 hours.

When implementing the above recovery method for exhaust gas purification catalysts, for example, the exhaust gas purification catalyst unit is detached from the exhaust system and the foregoing recovery process is performed to the detached catalyst unit in a prescribed device. It is however preferable that the recovery method be performed to the exhaust gas purification catalyst unit in the exhaust system without detaching it therefrom. In this case, for example, the oxidization of the catalysts is accomplished by increasing the air-fuel ratio (A/F) of air-fuel mixtures to an extremely high ratio by introducing a large amount of air via an air valve provided upstream of the exhaust gas purification catalyst unit and/or by sharply reducing the amount of fuel to be supplied. Also, the exhaust gas purification catalysts may be heated using a specific heating device or by utilizing the reaction heat of the exhaust gas purification catalysts.

In the case where the process for oxidizing the exhaust gas purification catalysts is performed without detaching the exhaust gas purification catalyst unit from the exhaust system as mentioned above, it is possible to perform the oxidization process in real time in accordance with the deterioration of the catalyst performance. For example, the recovery process may be regularly performed in accordance with the time period for which the vehicle has been running or the distance that the vehicle has traveled so far. Also, if an NOx sensor or a CO sensor is provided downstream of the exhaust gas purification catalyst unit to detect a density of NOx or CO for checking the catalyst performance, the recovery process may be activated in response to the sensor detecting the density larger than a threshold.

The process for reducing platinum after redispersion thereof may be performed by, for example, heating the exhaust gas purification catalysts under a reducing gas such as a hydrogen gas and a carbon monoxide gas. For example, in the case where the exhaust gas purification catalyst is used in an automobile, an exhaust gas having a stoichiometric air-fuel ratio or a fuel-rich air-fuel ratio can be used as the reducing gas. Thus, the oxidization process and the reduction process for the exhaust gas purification catalysts can be performed without detaching the exhaust gas purification catalyst unit from the exhaust system and as a part of the air-fuel ratio control. Note that the heating temperature used in the oxidization process is set to a value that causes reduction of platinum oxides, e.g., 300° C. or higher.

The metal oxide catalyst carrier particles according to the aspect of the invention may be produced in an arbitrary method, such as the one described in JP-A-2005-314133 which is used to produce metal oxide particles each having a center portion and an outer skin portion that are different in composition from each other.

Also, the metal oxide catalyst carrier particles according to the aspect of the invention may be produced by a metal oxide catalyst carrier particle production method according to an aspect of the invention.

For example, metal oxide catalyst carrier particles according to the aspect of the invention, each of which has a center portion and an outer skin portion that are different in composition, can be produced in a method including the steps of: preparing a material solution containing at least colloid particles of first metal oxides and metal salts for second metal oxides; adjusting the pH of the material solution closer to the isoelectric point of the colloid particles of the first metal oxides so as to coagulate the colloid particles of the first metal oxides; increasing the pH of the material solution so as to precipitate the colloid particles of the second metal oxides from the metal salts and coagulate the precipitated colloid particles of the second metal oxides around the coagulated colloid particles of the first metal oxides, where the isoelectric point of the colloid particles of the second metal oxides is higher than the isoelectric point of the colloid particles of the first metal oxides; and drying and calcining the coagulated product.

Hereinafter, each step of the metal oxide catalyst carrier particle production method according to the aspect of the invention will be described.

According to this aspect of the invention, a material solution containing at least colloid particles of first metal oxides and metal salts for second metal oxides are first prepared.

The colloid particles of the first metal oxides used herein are obtained by, for example, hydrolytic degradation and condensation of the first metal that is selected from alcoxide, acetylacetonato, acetate, nitrate salt, and so on. Alternatively, sols such as alumina sol, zirconia sol, titania sol, and ceria sol, which are known materials and commercially available, may be used.

The pH of each commercially available sol is not close to the isoelectric point of the colloid particles contained in the sol so that the colloid particles are not coagulated due to electrostatic repulsions among them. That is, a sol containing colloid particles having an isoelectric point on the alkali side is stabilized by acidifying the sol (acid-stabilized sol), and a sol containing colloid particles having an isoelectric point on the acidic side is stabilized by alkalifying the sol (alkali-stabilized sol).

The isoelectric point of colloid particles not only depends on the material of the colloid particles, such as oxides constituting the particles. That is, the isoelectric point of colloid particles may be arbitrarily set by reforming the surfaces of the colloid particles, preferably by reforming the surfaces of the colloid particles using organic compounds.

As mentioned, the isoelectric point of the colloid particles can be set, in an arbitrary method, to a level necessary for the production method according to the aspect of the invention. The isoelectric point thus set may be measured by, for example, an electrophoresis light-scattering method.

Meanwhile, the metal salts for the second metal oxides used herein are, for example, carboxylate, such as acetate, or mineral salts, such as nitrate and sulfate.

A material solution containing at least colloid particles of the first metal oxides and metal salts for the second metal oxides can be obtained in an arbitrary method. For example, such a material solution can be obtained by dissolving the metal salts for the second metal oxides into a sol containing the colloid particles of the first metal oxide or by mixing a sol containing the colloid particles of the first metal oxide and a sol containing the metal salts for the second metal oxide. The mixing ratio between the colloid particles of the first metal oxide and the metal salts for the second metal oxide may be set to an arbitrary ratio depending upon the desired characteristics of the metal oxide particles.

In the production method according to this aspect of the invention, metal oxides that may be contained in the metal oxide catalyst carrier particles in addition to the first and second metal oxides may be contained in the material solution in the form of colloid particles and/or metal salts, such as nitrate.

Figure 2:
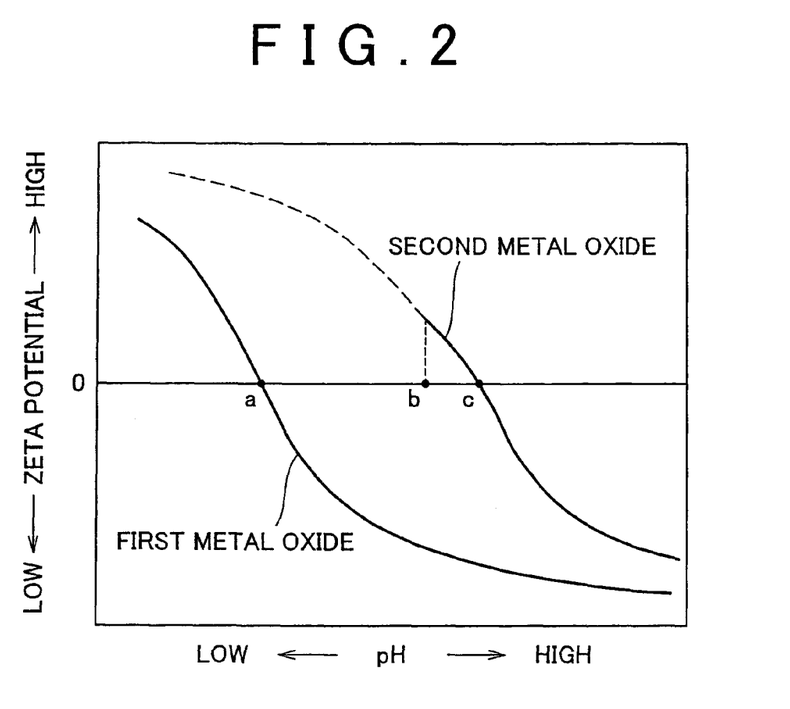
FIG. 2 is a graph indicating how the zeta potential of the colloid particles of the first and second metal oxides used in a metal oxide catalyst carrier particle producing method according to the invention changes.

In the production method according to this aspect of the invention, the pH of the material solution is then adjusted closer to the isoelectric point of the colloid particles of the first metal oxide (Point a in FIG. 2) so as to coagulate the colloid particles of the first metal oxide. FIG. 2 is a graph showing how the zeta potentials of the colloid particles of the first and second metal oxides change.

As described above, the pH of each commercially available sol is not close to the isoelectric point of the colloid particles contained in the sol so that the colloid particles will not be coagulated due to electrostatic repulsions among them. Therefore, if the pH of the material solution is adjusted closer to the isoelectric point of the colloid particles of the first metal oxide as in the above-mentioned process, the zeta potential of the colloid particles of the first metal oxide decreases, which suppresses electric repulsions among the colloid particles and thus promotes their coagulation.

The pH of the material solution can be adjusted by adding alkali such as ammonia water and sodium hydroxide, or acid such as acetic acid, nitric acid, and hydrochloric acid. Also, the pH of the material solution can be adjusted by simply mixing a sol containing the colloid particles of the first metal oxides and a solution containing the metal salts for the second metal oxides.

When adjusting the pH of the material solution, for example, acid or alkali is added to the material solution while measuring the pH of the material solution using a pH meter. Alternatively, the adjustment of the pH of the material solution may be such that the amount of acid or alkali needed to obtain a specific pH of a sample of the material solution is measured in advance and the amount of acid or alkali needed for the entire material solution is determined based on the measured amount and the determined amount of acid or alkali is added to the material solution.

Precipitation and Coagulation of Colloid Particles of Second Metal Oxides In the production method according to the aspect of the invention, the pH of the material solution is then increased so that colloid particles of the second metal oxide are precipitated from the metal salts (Point b in FIG. 2) and the precipitated colloid particles of the second metal oxides are then coagulated around the coagulated colloid particles of the first metal oxides (point c in FIG. 2).

A salt solution, preferably an aqueous salt solution, such as a metal acetate solution and a metal nitrate solution, is relatively effective to precipitate colloidal particles of metal oxides at an alkaline pH. Therefore, if the pH of the material solution containing the metal salts for the second metal oxide is increased as in this production step, colloid particles of the second metal oxides are precipitated from the metal salts.

In the production method, the isoelectric point of the precipitated colloid particles of the second metal oxides is higher than the isoelectric point of the colloid particles of the first metal oxide. As mentioned above, the isoelectric point of colloidal particles is not limited by the materials of the colloid particles, such as oxides, but it may be arbitrarily set by reforming the surfaces of the colloid particles, especially by reforming the surfaces of the colloid particles using organic compounds.

Thus, in order to create a situation where the isoelectric point of the colloid particles of the second metal oxides is higher than the isoelectric point of the colloid particles of the first metal oxide, colloid particles having a relatively low isoelectric point are selected as the colloidal particles of the first metal oxides, for example. Specifically, the colloid particles of the first metal oxides and the metal salts for the second metal oxides are selected such that the difference between the pH at the isoelectric point of the colloid particles of the second metal oxides and the pH at the isoelectric point of the colloid particles of the first metal oxides (i.e., the difference between Point a and Point c in FIG. 2) is 3 or more, preferably 4 or more, and more preferably 5 or more.

In the case where the isoelectric point of the colloid particles of the second metal oxide is higher than the isoelectric point of the colloid particles of the first metal oxide as described above, when the zeta potential of the colloid particles of the first metal oxide is low enough to cause the coagulation of the colloid particles of the first metal oxides, the second metal oxides are present in the material solution in the form of salts dissolved therein, or in the form of colloid particles having a relatively high zeta potential, and therefore the coagulation of colloid particles of the second metal oxides suppressed.

Then, as the pH of the material solution containing the coagulated colloid particles of the first metal oxides is changed to a point close to the isoelectric point of the colloid particles of the second metal oxides, the zeta potential of the colloid particles of the second metal oxides becomes low so that electrostatic repulsions among these colloid particles are reduced and thus the coagulation of the colloid particles of the second metal oxides is promoted. At this time, because the difference between the pH of the material solution and the isoelectric point of the colloid particles of the first metal oxides is relatively large, the coagulation of the colloid particles of the first metal oxides is suppressed and the colloid particles of the second metal oxide are coagulated around the colloid particles of the first metal oxide.

Note that the pH of the material solution is adjusted in the same manner as that for the coagulation of the first metal oxides.

Then, by drying and calcining the coagulated product, metal oxide particles each having a center portion that is principally comprised of components derived from the colloid particles of the first metal oxides and an outer skin portion that is principally composed of components derived from the colloid particles of the second metal oxides are obtained.

The process for removing the dispersion medium from the material solution and drying the material solution can be performed using an arbitrary method and at an arbitrary temperature. For example, the material solution is heated in an oven at 120° C. The material obtained by removing the dispersion medium from the material solution and drying the material solution is then calcined to obtain metal oxide particles. This calcination can be performed at a temperature that is typically used to synthesize metal oxides, such as 500 to 1100° C.

Hereinafter, examples of the invention will be described. Note that the invention is not limited to these examples.

In the experiments described below, the pH of each solution was measured using a pH meter, more specifically, by directly soaking the electrode of the pH meter into the solution.

Example 1

In the example 1, metal oxide catalyst carrier particles each having a center portion that is principally composed of zirconia and an outer skin portion that is principally composed of scandium oxides was obtained and platinum was then bonded onto the obtained metal oxide carrier particles so that the platinum is supported thereon.

Nitric acid was added to a 10 mass % alkali-stabilized zirconia sol (i.e., a zirconia sol having a relatively acidic isoelectric point) so as to adjust its pH to 1. Then, scandium nitrate tetrahydrate was added into distilled water that is six times larger in weight than the added scandium nitrate tetrahydrate. This solution was then added to the zirconia sol such that the amount of scandium is 30 mol % with respect to the zirconium contained in the zirconia sol. Then, the thus obtained mixture solution was agitated for an hour. Next, a 28% ammonia water was added to the mixture solution to adjust its pH to 9, and the mixture solution was then dried at 120° C. to remove water contents therefrom and thereafter calcined at 600° C. for 5 hours. The product obtained by this calcination was then pulverized using a mortar. This is how the metal oxide catalyst carrier particles according to the example 1 were obtained.

Next, the obtained metal oxide catalyst carrier particles were dispersed in a distilled water that is six times larger in weight than the metal oxide catalyst carrier particles, and a dinitrodiammine platinum solution was then added such that a 1.0 wt % platinum is present with respect to the metal oxide catalyst carrier particles, and the solution was then agitated for an hour. Then, the solution was dried at 120° C. to remove water contents therefrom and thereafter calcined at 500° C. for 2 hours.

Example 2

In the example 2, metal oxide catalyst carrier particles each having a center portion that is principally composed of zirconia and an outer skin portion that is principally composed of yttrium oxides were prepared in a procedure that is the same as the procedure in the example 1 except that yttrium nitrate hexahydrate was used instead of scandium nitrate tetrahydrate. Then, platinum was bonded onto the obtained metal oxide catalyst carrier particles in the same manner as that in the example 1, so that the platinum is supported on the metal oxide catalyst carrier particles.

Example 3

In the example 3, metal oxide catalyst carrier particles each having a center portion that is principally composed of zirconia and an outer skin portion that is principally composed of neodymium oxides were prepared in a procedure that is the same as the procedure in the example 1 except that neodymium nitrate hexahydrate was used instead of scandium nitrate tetrahydrate. Then, platinum was bonded onto the obtained metal oxide catalyst carrier particles in the same manner as that in the example 1, so that the platinum is supported on the metal oxide catalyst carrier particles.

Example 4

In the example 4, metal oxide catalyst carrier particles each having a center portion that is principally composed of zirconia and an outer skin portion that is principally composed of praseodymium oxides were prepared in a procedure that is the same as the procedure in the example 1 except that praseodymium nitrate hexahydrate was used instead of scandium nitrate tetrahydrate. Then, platinum was bonded onto the obtained metal oxide catalyst carrier particles in the same manner as that in the example 1, so that the platinum is supported on the metal oxide catalyst carrier particles.

Example 5

In the example 5, metal oxide catalyst carrier particles each having a center portion that is principally composed of zirconia and an outer skin portion that is principally composed of lanthanum oxides were prepared in a procedure that is the same as the procedure in the example 1 except that lanthanum nitrate hexahydrate was used instead of scandium nitrate and tetrahydrate. Then, platinum was bonded onto the obtained metal oxide catalyst carrier particles in the same manner as that in the example 1, so that the platinum is supported on the metal oxide catalyst carrier particles.

Example 6

In the example 6, metal oxide catalyst carrier particles each having a center portion that is principally composed of alumina and an outer skin portion that is principally composed of scandium oxides were prepared in a procedure that is the same as the procedure in the example 1 except that an alkali-stabilized alumina sol was used instead of the alkali-stabilized zirconia sol. Then, platinum was bonded onto the obtained metal oxide catalyst carrier particles in the same manner as that in the example 1, so that the platinum is supported on the metal oxide catalyst carrier particles.

Example 7

In the example 7, metal oxide catalyst carrier particles each having a center portion that is principally composed of alumina and an outer skin portion that is principally composed of yttrium oxides were prepared in a procedure that is the same as the procedure in the example 1 except that yttrium nitrate hexahydrate was used instead of scandium nitrate tetrahydrate and an alkali-stabilized alumina sol was used instead of the alkali-stabilized zirconia sol. Then, platinum was bonded onto the obtained metal oxide catalyst carrier particles in the same manner as that in the example 1, so that the platinum is supported on the metal oxide catalyst carrier particles.

Example 8

In the example 8, metal oxide catalyst carrier particles each having a center portion that is principally composed of alumina and an outer skin portion that is principally composed of neodymium oxides were prepared in a procedure that is the same as the procedure in the example 1 except that neodymium nitrate hexahydrate was used instead of scandium nitrate tetrahydrate and an alkali-stabilized alumina sol was used instead of the alkali-stabilized zirconia sol. Then, platinum was bonded onto the obtained metal oxide catalyst carrier particles in the same manner as that in the example 1, so that the platinum is supported on the metal oxide catalyst carrier particles.

Example 9

In the example 9, metal oxide catalyst carrier particles each having a center portion that is principally composed of alumina and an outer skin portion that is principally composed of praseodymium oxides were prepared in a procedure that is the same as the procedure in the example 1 except that praseodymium nitrate hexahydrate was used instead of scandium nitrate tetrahydrate and an alkali-stabilized alumina sol was used instead of the alkali-stabilized zirconia sol. Then, platinum was bonded onto the obtained metal oxide catalyst carrier particles in the same manner as that in the example 1, so that the platinum is supported on the metal oxide catalyst carrier particles.

Example 10

In the example 10, metal oxide catalyst carrier particles each having a center portion that is principally composed of alumina and an outer skin portion that is principally composed of lanthanum oxides were prepared in a procedure that is the same as the procedure in the example 1 except that lanthanum nitrate hexahydrate was used instead of scandium nitrate tetrahydrate and an alkali-stabilized alumina sol was used instead of the alkali-stabilized zirconia sol. Then, platinum was bonded onto the obtained metal oxide catalyst carrier particles in the same manner as that in the example 1, so that the platinum is supported on the metal oxide catalyst carrier particles.

Comparative Example 1

In the comparative example 1, metal oxide catalyst carrier particles each having a center portion that is principally composed of zirconia and an outer skin portion that is principally composed of ceria were prepared in a procedure that is the same as the procedure in the example 1 except that diammonium cerium nitrate was used instead of scandium nitrate tetrahydrate. Then, platinum was bonded onto the obtained metal oxide catalyst carrier particles in the same manner as that in the example 1, so that the platinum is supported on the metal oxide catalyst carrier particles.

Comparative Example 2

In the comparative example 2, metal oxide catalyst carrier particles composed of a ceria-zirconia solid solution were prepared and platinum was then bonded thereon in the manner described below.

Diammonium cerium nitrate and zirconium oxynitrate were added to distilled water and the distilled water was then agitated so that the added diammonium cerium nitrate and zirconium oxynitrate are dissolved therein. The amounts of the added diammonium cerium nitrate and zirconium oxynitrate were such that the metal oxide catalyst carrier particles have the same composition as that of the metal oxide catalyst carrier particles in the comparative example 1. Thereafter, the pH of the mixture solution was adjusted by adding a 28% ammonia water, so that precipitation occurs. Then, the mixture solution was dried at 120° C. to remove water contents therefrom, and thereafter calcined at 600° C. for 5 hours. The product obtained by this calcination was then pulverized using a mortar. This is how the metal oxide catalyst carrier particles of the comparative example 2 were obtained. Then, platinum was bonded onto the metal oxide catalyst carrier particles as in the same manner as that in the example 1, so that the platinum is supported on the metal oxide catalyst carrier particles.

Comparative Example 3

In the comparative example 3, metal oxide catalyst carrier particles composed of alumina only were obtained and platinum was bonded thereon in the manner described below.

A 28% ammonia water was added to a 10 mass % alkali-stabilized alumina sol to adjust its pH to 9. This mixture solution was dried at 120° C. to remove water contents therefrom, was then calcined at 600° C. for 5 hours. The product obtained by this calcination was then pulverized using a mortar. This is how metal oxide catalyst carrier particles composed of alumina only were obtained. Then, platinum was bonded onto the metal oxide catalyst carrier particles in the same manner as that in the example 1, so that the platinum is supported on the metal oxide catalyst carrier particles.

Comparative Example 4

In the comparative example 4, metal oxide catalyst carrier particles each composed of zirconia only were prepared in a procedure that is the same as the procedure in the comparative example 3 except that an alkali-stabilized zirconia sol was used instead of the alkali-stabilized alumina sol. Then, platinum was bonded onto the obtained metal oxide catalyst carrier particles in the same manner as that in the example 1, so that the platinum is supported on the metal oxide catalyst carrier particles.

Comparative Example 5

In the comparative example 5, metal oxide catalyst carrier particles composed of scandium oxides only were obtained and platinum was bonded thereon in the manner described below.

Scandium nitrate tetrahydrate was added to a distilled water that is six times greater in weight than the added scandium nitrate tetrahydrate, and a 28% ammonia water was then added to the obtained solution to adjust its pH to 9. The solution was then dried at 120° C. to remove water contents therefrom and thereafter calcined at 600° C. for 5 hours. The product obtained by this calcination was then pulverized using a mortar. This is how metal oxide catalyst carrier particles composed of scandium oxides only were obtained. Then, platinum was bonded onto the metal oxide catalyst carrier particles in the same manner as that in the example 1, so that the platinum is supported on the metal oxide catalyst carrier particles.

Comparative Example 6

In the comparative example 6, metal oxide catalyst carrier particles composed of yttrium oxides only were prepared in a procedure that is the same as the procedure in the comparative example 5 except that yttrium nitrate hexahydrate was used instead of scandium nitrate tetrahydrate. Then, platinum was bonded onto the obtained metal oxide catalyst carrier particles in the same manner as that in the example 1, so that the platinum is supported on the metal oxide catalyst carrier particles.

Comparative Example 7

In the comparative example 7, metal oxide catalyst carrier particles composed of neodymium oxides only were prepared in a procedure that is the same as the procedure in the comparative example 5 except that neodymium oxides hexahydrate was used instead of scandium nitrate tetrahydrate. Then, platinum was bonded onto the obtained metal oxide catalyst carrier particles in the same manner as that in the example 1, so that the platinum is supported on the metal oxide catalyst carrier particles.

Comparative Example 8

In the comparative example 8, metal oxide catalyst carrier particles composed of praseodymium oxides only were prepared in a procedure that is the same as the procedure in the comparative example 5 except that praseodymium oxides hexahydrate was used instead of scandium nitrate tetrahydrate. Then, platinum was bonded onto the obtained metal oxide catalyst carrier particles in the same manner as that in the example 1, so that the platinum is supported on the metal oxide catalyst carrier particles.

Comparative Example 9

In the comparative example 9, metal oxide catalyst carrier particles composed of lanthanum oxides only were prepared in a procedure that is the same as the procedure in the fifth comparative example except that lanthanum nitrate hexahydrate was used instead of scandium nitrate tetrahydrate. Then, platinum was bonded onto the obtained metal oxide catalyst carrier particles in the same manner as that in the example 1, so that the platinum is supported on the metal oxide catalyst carrier particles.

The isoelectric points of the metal oxide catalyst carrier particles in the respective examples and comparative examples were measured. Table 1 shows the results of the measurement. For comparison, Table 1 also shows the isoelectric point of the oxides forming the outer skin portion and the isoelectric point of the oxides forming the center portion in the metal oxide catalyst carrier particles obtained in the respective examples and comparative examples.

TABLE 1

Isoelectric Point of Metal Oxide Catalyst Carrier Particles

| | | Isoelectric Point (pH) | | |
| --- | --- | --- | --- | --- |
| | | Simple Substance | | Outer Skin |
| | | Oxides of Outer Skin Portion | Oxides of Center Portion | Portion and Center portion |
| Example 1 | Pt/$Sc_2O_3$ (Outer Skin Portion) and $ZrO_2$ (Center Portion) | 9.2 | 5.3 | 9.3 |
| Example 2 | Pt/$Y_2O_3$ (Outer Skin Portion) and $ZrO_2$ (Center Portion) | 9.3 | | 8.9 |
| Example 3 | Pt/$Nd_2O_3$ (Outer Skin Portion) and $ZrO_2$ (Center Portion) | 10.1 | | 10.0 |
| Example 4 | Pt/$Pr_6O_{11}$ (Outer Skin Portion) and $ZrO_2$ (Center Portion) | 9.8 | | 10.4 |
| Example 5 | Pr/$La_2O_3$ (Outer Skin Portion) and $ZrO_2$ (Center Portion) | 10.5 | | 9.9 |
| Example 6 | Pt/$Sc_2O_3$ (Outer Skin Portion) and $Al_2O_3$ (Center Portion) | 9.2 | 6.9 | 9.5 |
| Example 7 | Pt/$Y_2O_3$ (Outer Skin Portion) and $Al_2O_3$ (Center Portion) | 9.3 | | 9.1 |
| Example 8 | Pt/$Nd_2O_3$ (Outer Skin Portion) and $Al_2O_3$ (Center Portion) | 10.1 | | 10.2 |
| Example 9 | Pt/$Pr_6O_{11}$ (Outer Skin Portion) and $Al_2O_3$ (Center Portion) | 9.8 | | 9.7 |
| Example 10 | Pt/$La_2O_3$ (Outer Skin Portion) and $Al_2O_3$ (Center Portion) | 10.5 | | 10.7 |
| Comparative Example 1 | Pt/$CeO_2$ (Outer Skin Portion) and $ZrO_2$ (Center Portion) | 9.6 | 5.3 | 9.1 |
| Comparative Example 2 | Pt/(Zr, Ce)$O_2$ | — | | 8.3 |
| Comparative Example 3 | $Al_2O_3$ | | 6.9 | — |
| Comparative Example 4 | $ZrO_2$ | | 5.3 | — |
| Comparative Example 5 | $Sc_2O_3$ | | 9.2 | — |
| Comparative Example 6 | $Y_2O_3$ | | 9.3 | — |
| Comparative Example 7 | $Nd_2O_3$ | | 10.1 | — |
| Comparative Example 8 | $Pr_6O_{11}$ | | 9.8 | — |
| Comparative Example 9 | $La_2O_3$ | | 10.5 | — |

As is evident from Table 1, in the respective examples and the comparative example 1, the isoelectric point of each metal oxide catalyst carrier particle is almost equal to the isoelectric point of the oxides forming the outer skin portion of the metal oxide catalyst carrier particle. That is, Table 1 indicates that, in the respective examples and comparative example 1, each metal oxide catalyst carrier particle includes a center portion that is principally composed of zirconia or alumina and an outer skin portion that is principally composed of scandium oxides, yttrium oxides, etc.

The catalysts obtained in the respective examples and comparative examples were examined using 1 mm×1 mm×1 mm cubic test pieces of the respective catalysts.

In the examination, each catalyst was placed to experience a condition that each catalyst is alternately exposed to a rich gas (carbon monoxide (2 volume %)+nitrogen) and to a lean gas (oxygen (2 volume %)+nitrogen) for 5 hours. During this, the supplied gas was switched between the rich gas and the lean gas every minute, and the flow rate of each gas was 5 litters per minute, and the gas temperature was 1000° C.

Then, as the redispersion process, the catalyst was placed in an electric furnace and heated at 600° C. for 2 hours in the atmosphere of air therein.

Then, the diameter of platinum particles that were not yet redispersed after experiencing the above condition and the diameter of platinum particles that had been redispersed after experiencing the above condition were measured using a carbon monoxide pulse adsorption method at −80° C. The platinum redispersion rates were calculated using the following equation.

Redispersion Rate(%)=[1−(diameter of platinum particle redispersed)/(diameter of platinum particle not redispersed)]×100

Figure 3:
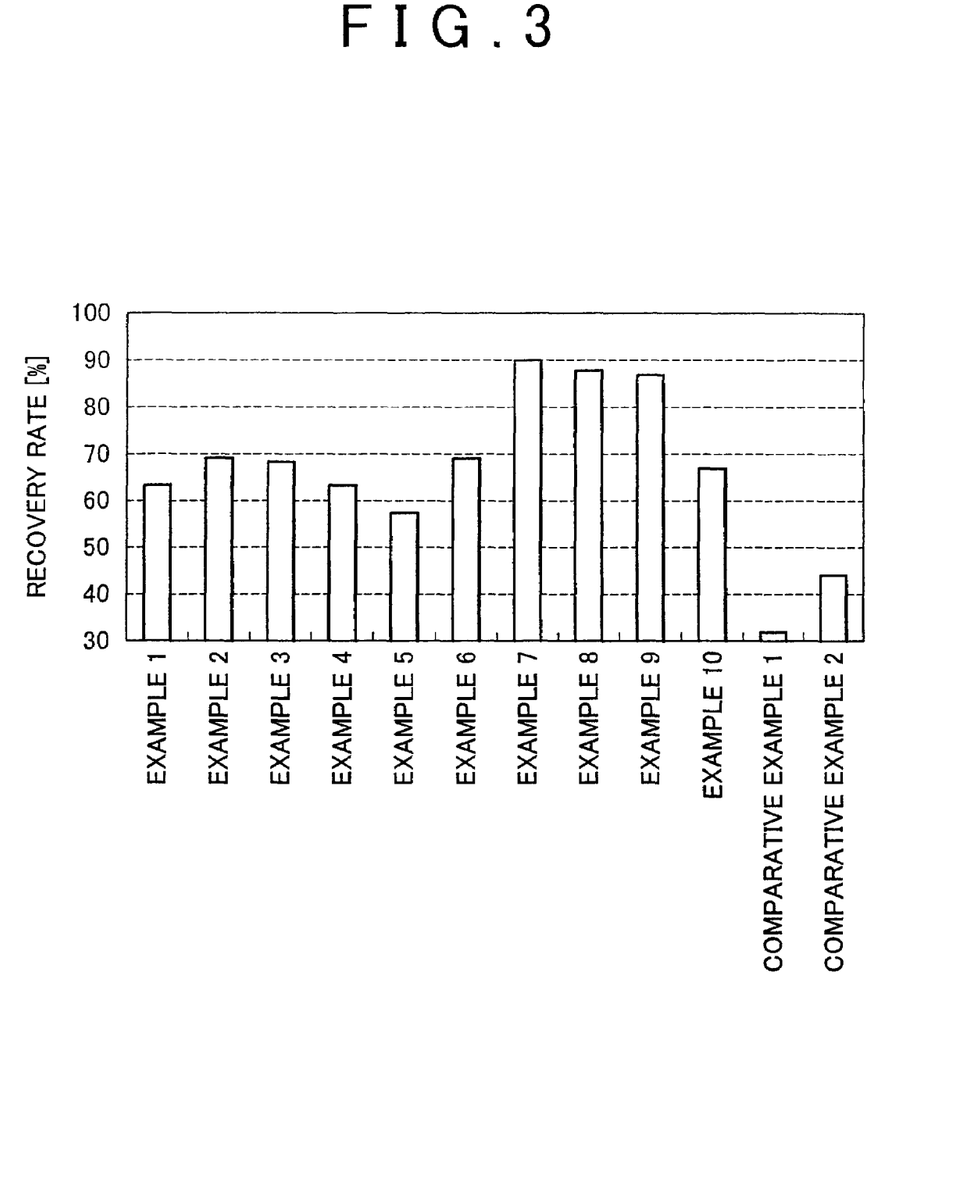
FIG. 3 is a graph indicating the platinum recovery rates in the respective examples and comparative examples.

When the redispersion rate is relatively large, it indicates that the platinum has been well redispersed by the redispersion process. Table 2 and FIG. 3 show the results.

TABLE 2

| | | Specific surface area of carrier after experiencing the condition (m²/g) | Pt particle diameter (nm) Before redispersed | Pt particle diameter (nm) After redispersed | Pt particle recovery rate (%) |
|---|---|---|---|---|---|
| Example 1 | Pt/Sc$_2$O$_3$ (Outer Skin Portion) and ZrO$_2$ (Center Portion) | 19 | 68 | 25 | 63 |
| Example 2 | Pt/Y$_2$O$_3$ (Outer Skin Portion) and ZrO$_2$ (Center Portion) | 31 | 46 | 14 | 69 |
| Example 3 | Pt/Nd$_2$O$_3$ (Outer Skin Portion) and ZrO$_2$ (Center Portion) | 25 | 57 | 18 | 68 |
| Example 4 | Pt/Pr$_6$O$_{11}$ (Outer Skin Portion) and ZrO$_2$ (Center Portion) | 21 | 61 | 23 | 63 |
| Example 5 | Pr/La$_2$O$_3$ (Outer Skin Portion) and ZrO$_2$ (Center Portion) | 21 | 63 | 27 | 57 |
| Example 6 | Pt/Sc$_2$O$_3$ (Outer Skin Portion) and Al$_2$O$_3$ (Center Portion) | 32 | 48 | 15 | 69 |
| Example 7 | Pt/Y$_2$O$_3$ (Outer Skin Portion) and Al$_2$O$_3$ (Center Portion) | 43 | 42 | 4 | 90 |
| Example 8 | Pt/Nd$_2$O$_3$ (Outer Skin Portion) and Al$_2$O$_3$ (Center Portion) | 45 | 43 | 5 | 88 |
| Example 9 | Pt/Pr$_6$O$_{11}$ (Outer Skin Portion) and Al$_2$O$_3$ (Center Portion) | 41 | 45 | 6 | 87 |
| Example 10 | Pt/La$_2$O$_3$ (Outer Skin Portion) and Al$_2$O$_3$ (Center Portion) | 35 | 49 | 16 | 67 |
| Comparative Example 1 | Pt/CeO$_2$ (Outer Skin Portion) and ZrO$_2$ (Center Portion) | 25 | 43 | 24 | 44 |
| Comparative Example 2 | Pt/(Zr,Ce)O$_2$ | 38 | 51 | 41 | 32 |
| Comparative Example 3 | Al$_2$O$_3$ | 67.0 | — | — | — |
| Comparative Example 4 | ZrO$_2$ | 13.0 | — | — | — |
| Comparative Example 5 | Sc$_2$O$_3$ | 11.2 | — | — | — |
| Comparative Example 6 | Y$_2$O$_3$ | 11.1 | — | — | — |
| Comparative Example 7 | Nd$_2$O$_3$ | 3.7 | — | — | — |
| Comparative Example 8 | Pr$_6$O$_{11}$ | 5.1 | — | — | — |
| Comparative Example 9 | La$_2$O$_3$ | 5.3 | — | — | — |

It is understood from Table 2 that the specific surface area of the exhaust gas purification catalyst of each examples is significantly larger than those in the comparative examples 5 to 9. Also, it is understood from Table 2 and FIG. 3 that the platinum particle recovery rates achieved in the respective examples are significantly higher than those in the comparative examples 1 and 2.

The invention claimed is:

1. A metal oxide catalyst carrier particle, comprising:
a center portion; and
an outer skin portion, wherein
the center portion and the outer skin portion each contain a first metal oxide and a second metal oxide,
the center portion and the outer skin portion are different in composition from each other,
a mole fraction of a metal of the first metal oxide is higher in the center portion than in the outer skin portion,
a mole fraction of a metal of the second metal oxide is higher in the outer skin portion than in the center portion, and
the second metal oxide is selected from the group consisting of rare earth oxides, except for ceria, and alkali earth metal oxides.

2. The metal oxide catalyst carrier particle according to claim 1, wherein
the first metal oxide is selected from the group consisting of alumina, zirconia, silica, titania, and combinations among alumina, zirconia, silica, and titania.

3. The metal oxide catalyst carrier particle according to claim 1, wherein
the first metal oxide is alumina.

4. The metal oxide catalyst carrier particle according to claim 1, wherein
the second metal oxide is selected from rare earth oxides, except for ceria.

5. The metal oxide catalyst carrier particle according to claim 1, wherein
the second metal oxide is selected from the group consisting of neodymium oxide, praseodymium oxide, lanthanum oxide, scandium oxide, and yttrium oxide.

6. The metal oxide catalyst carrier particle according to claim 1, wherein
a specific surface area of the metal oxide catalyst carrier particle is more than 15 m²/g after the metal oxide catalyst carrier particle has been alternately exposed to a rich gas (carbon monoxide (2 volume %)+nitrogen) and to a lean gas (oxygen (2 volume %)+nitrogen) at 1000° C. for 5 hours such that the gas to which the metal oxide catalyst carrier particle is exposed is switched between the rich gas and the lean gas every minute.

7. The metal oxide catalyst carrier particle according to claim 1, wherein the first metal oxide is alumina, the second metal oxide is selected from the group consisting of neodymium oxide, praseodymium oxide, and yttrium oxide, and a specific surface area of the metal oxide catalyst carrier particle is more than 40 $m^2/g$ after the metal oxide catalyst carrier has been alternately exposed to a rich gas (carbon monoxide (2 volume %)+nitrogen) and to a lean gas (oxygen (2 volume %)+nitrogen) at 1000° C. for 5 hours such that the gas to which the metal oxide catalyst is exposed is switched between the rich gas and the lean gas every minute.

8. The metal oxide catalyst carrier particle according to claim 1, wherein the composition at a boundary between the center portion and the outer skin portion gradually varies.

9. The metal oxide catalyst carrier particle according to claim 1, wherein a boundary between the center portion and the outer skin portion is composed of a mixture of the first metal oxide and the second metal oxide.

10. An exhaust gas purification catalyst comprising the metal oxide catalyst carrier particle according to claim 1 and platinum supported on the metal oxide catalyst carrier particle.

11. A method for recovering an exhaust gas purification catalyst, the method comprising:

heating the exhaust gas purification catalyst according to claim 10 to 500° C. or higher under an oxidizing atmosphere that contains oxygen.

12. The method according to claim 11, further comprising:

reducing a platinum after the exhaust gas purification catalyst has been heated under the oxygen containing oxidizing atmosphere.

13. A method for producing a metal oxide catalyst carrier particle having a center portion and an outer skin portion, each containing a first metal oxide and a second metal oxide, wherein the center portion and the outer skin portion are different in composition from each other, comprising:

preparing a material solution containing at least colloid particles of the first metal oxide and metal salts for the second metal oxide;

adjusting the pH of the material solution closer to the isoelectric point of the colloid particles of the first metal oxide so as to coagulate the colloid particles of the first metal oxide;

increasing the pH of the material solution so as to precipitate colloid particles of the second metal oxide from the metal salts and coagulate the colloid particles of the second metal oxide around the coagulated colloid particles of the first metal oxide, the isoelectric point of the colloid particles of the second metal oxide being higher than the isoelectric point of the colloid particles of the first metal oxide; and drying and calcining the coagulated product, wherein the second metal oxide is selected from the group consisting of rare earth oxides except for ceria and alkali earth metal oxides.

14. The method according to claim 13, further comprising:

selecting the first metal oxide from the group consisting of alumina, zirconia, silica, titania, and combinations among alumina, zirconia, silica, and titania.

15. A metal oxide catalyst carrier particle, comprising:

a center portion; and an outer skin portion, wherein the center portion and the outer skin portion each contain a first metal oxide and a second metal oxide, the center portion and the outer skin portion are different in composition from each other, the center portion mainly comprising the first metal oxide and the outer skin portion mainly comprising the second metal oxide, a mole fraction of a metal of the first metal oxide is higher in the center portion than in the outer skin portion, a mole fraction of a metal of the second metal oxide is higher in the outer skin portion than in the center portion, and the second metal oxide is selected from the group consisting of rare earth oxides, except for ceria, and alkali earth metal oxides.

* * * * *